(12) United States Patent
Kawai et al.

(10) Patent No.: US 10,648,449 B2
(45) Date of Patent: May 12, 2020

(54) HYDROELECTRIC POWER GENERATION APPARATUS

(71) Applicant: NTN CORPORATION, Osaka-shi, Osaka (JP)

(72) Inventors: Tomoya Kawai, Iwata (JP); Yoshio Fujikawa, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/079,841

(22) PCT Filed: Feb. 1, 2017

(86) PCT No.: PCT/JP2017/003592
§ 371 (c)(1),
(2) Date: Aug. 24, 2018

(87) PCT Pub. No.: WO2017/145683
PCT Pub. Date: Aug. 31, 2017

(65) Prior Publication Data
US 2019/0072065 A1 Mar. 7, 2019

(30) Foreign Application Priority Data
Feb. 26, 2016 (JP) ................. 2016-035878

(51) Int. Cl.
*F03B 7/00* (2006.01)
*F03B 11/06* (2006.01)
(Continued)

(52) U.S. Cl.
CPC ............... *F03B 15/00* (2013.01); *F03B 7/00* (2013.01); *F03B 17/061* (2013.01);
(Continued)

(58) Field of Classification Search
CPC ...... F03B 15/00; F03B 17/061; F03B 17/063; F03B 7/00; F05B 2220/32;
(Continued)

(56) References Cited

U.S. PATENT DOCUMENTS 806,817 A * 12/1905 Mather .................... B63H 1/04
416/109
4,241,283 A * 12/1980 Storer, Sr. ................ E02B 9/04
290/43
(Continued)

FOREIGN PATENT DOCUMENTS

CN 202926509 U 5/2013
CN 104685206 A 6/2015
(Continued)

OTHER PUBLICATIONS

International Search Report issued in corresponding International Patent Application No. PCT/JP2017/003592, dated Apr. 4, 2017, with English Translation.
(Continued)

*Primary Examiner* — Tulsidas C Patel
*Assistant Examiner* — S. Mikailoff
(74) *Attorney, Agent, or Firm* — McDermott Will & Emery LLP

(57) ABSTRACT

A hydroelectric power generation apparatus includes a hydroelectric power generation module, a supporting part, and a bar. The hydroelectric power generation module includes a rotary blade and a power generator that generates power by rotation of the rotary blade. The supporting part supports the hydroelectric power generation module. The supporting part can be installed at a water channel. The bar is connected to the supporting part to protrude from the supporting part. With one end of the bar closer to the supporting part or a portion of the supporting part serving as
(Continued)

a center, the other end of the bar opposite to one end of the bar can be pivoted to switch a first state to a second state and vice versa.

6 Claims, 16 Drawing Sheets

(51) Int. Cl.
*F03B 15/00* (2006.01)
*F03B 17/06* (2006.01)

(52) U.S. Cl.
CPC ........ *F03B 17/063* (2013.01); *F05B 2220/32* (2013.01); *F05B 2220/706* (2013.01); *F05B 2240/90* (2013.01); *F05B 2240/916* (2013.01); *Y02E 10/223* (2013.01); *Y02E 10/226* (2013.01); *Y02E 10/28* (2013.01); *Y02E 10/38* (2013.01)

(58) Field of Classification Search
CPC ............ F05B 2220/706; F05B 2240/90; F05B 2240/916; Y02E 10/223; Y02E 10/226; Y02E 10/28; Y02E 10/38
See application file for complete search history.

(56) References Cited

U.S. PATENT DOCUMENTS

| | | | | |
|---|---|---|---|---|
| 4,256,970 A * | 3/1981 | Tomassini | ............... | F03B 13/10 290/53 |
| 4,818,888 A * | 4/1989 | Lenoir, III | ............ | F03B 17/065 290/43 |
| 5,882,143 A * | 3/1999 | Williams, Jr. | ............ | E02B 9/00 290/53 |
| 7,429,803 B2 * | 9/2008 | Davis | .................... | F03B 11/004 290/43 |
| 2007/0182159 A1 * | 8/2007 | Davis | .................... | F03B 11/004 290/54 |
| 2012/0007361 A1 * | 1/2012 | Agtuca | ..................... | H02P 9/04 290/43 |
| 2012/0032451 A1 * | 2/2012 | Heitmann | ................. | F03B 7/00 290/1 D |
| 2012/0119499 A1 * | 5/2012 | Kato | ..................... | F03B 17/063 290/52 |
| 2013/0062882 A1 * | 3/2013 | Zammataro | ............. | F03B 13/06 290/52 |
| 2018/0223792 A1 * | 8/2018 | Fujita | ..................... | F03B 11/08 |
| 2019/0072065 A1 * | 3/2019 | Kawai | ..................... | F03B 7/00 |
| 2019/0162162 A1 * | 5/2019 | Fujita | ..................... | F03B 15/06 |

FOREIGN PATENT DOCUMENTS

| | | |
|---|---|---|
| EP | 2458197 A1 | 5/2012 |
| EP | 2910771 | 8/2015 |
| JP | 60-124587 U | 8/1985 |
| JP | H2-108916 | 8/1990 |
| JP | 11-83290 A | 3/1999 |
| JP | 2005-76626 A | 3/2005 |
| JP | 2013-241841 A | 12/2013 |
| JP | 2015-014219 A | 1/2015 |
| WO | 2011/010675 A1 | 1/2011 |

OTHER PUBLICATIONS

Extended European Search Report issued in European Patent Application No. 17756125.5, dated Jun. 14, 2019.
Communication pursuant to Article 94(3) EPC issued in corresponding European Patent Application No. 17756125.5, dated Nov. 27, 2019.
Chinese First Office Action issued in corresponding Chinese Patent Application No. 201780013224.8, dated Dec. 6, 2019, with English translation.
Notice of Grounds of Rejection issued in corresponding Japanese Patent Application No. 2016-035878, dated Jan. 7, 2020, with English translation.

* cited by examiner

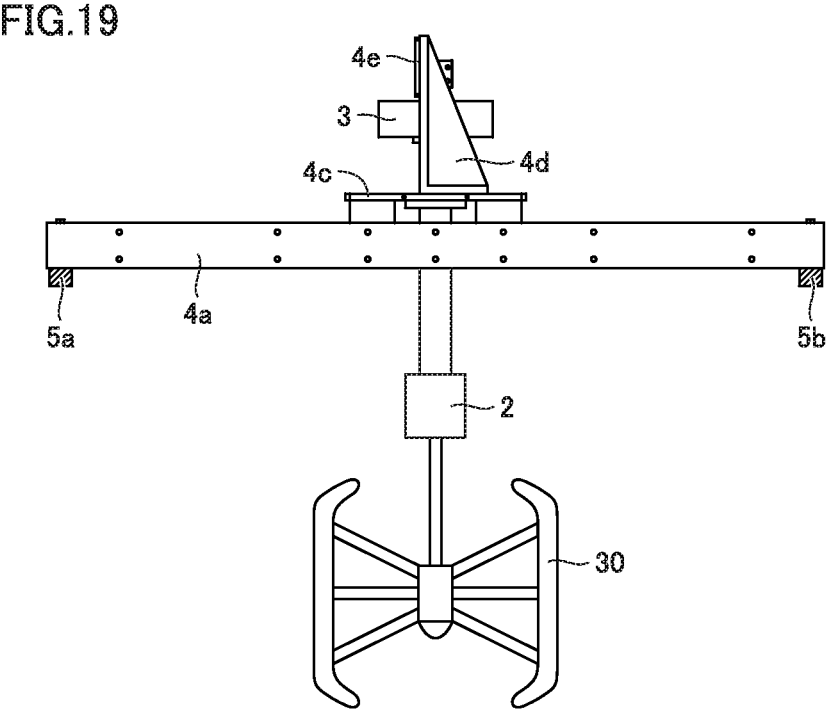

HYDROELECTRIC POWER GENERATION APPARATUS

CROSS REFERENCE TO RELATED APPLICATIONS

This application is the U.S. National Phase under 35 U.S.C. § 371 of International Application No. PCT/JP2017/003592, filed on Feb. 1, 2017, which claims the benefit of Japanese Application No. 2016-035878, filed on Feb. 26, 2016, the entire contents of each are hereby incorporated by reference.

TECHNICAL FIELD

The present invention relates to a hydroelectric power generation apparatus, and more specifically to a hydroelectric power generation apparatus installed in a water channel.

BACKGROUND ART

Conventionally, a hydroelectric power generation apparatus installed in a water channel is known. When a small-sized hydroelectric power generation apparatus utilizing a water channel used for agricultural water, city water, industrial water, and the like has its rotary blade, gears, bearings, oil seals and the like replaced for maintenance, the apparatus needs to be lifted out of a water current. In addition, the hydroelectric power generation apparatus also needs to he lifted out of the water current in an emergency, such as rising of water, to prevent the apparatus from being damaged. Conventionally, when lifting a hydroelectric power generation apparatus upward, a crane vehicle has been used or a large-scale lifting mechanism has been used for lifting the apparatus (for example, refer to Japanese Patent Laying-Open No. 2015-014219). The conventional hydroelectric power generation apparatus disclosed in the above document includes a lifting mechanism composed of a pulley, a wire, a weight, and the like.

CITATION LIST

Patent Document

PTD 1: Japanese Patent Laying-Open No. 2015-014219

SUMMARY OF INVENTION

Technical Problem

However, for such a small-sized hydroelectric power generation apparatus installed in a water channel as described above, installing such a large-scale lifting mechanism as described above is a factor of inviting an increased cost. More specifically, such a small-sized hydroelectric power generation apparatus utilizing a water channel as described above generates a small amount of power. Accordingly, installing such a lifting mechanism as described above would make a cost for installing the hydroelectric power generation apparatus excessive relative to the amount of power that the apparatus generates.

The present invention has been made in order to solve the aforementioned problem, and an object of the present invention is to provide a hydroelectric power generation apparatus which can dispense with a large-scale device when the apparatus is lifted out of a water current, and for example can be lifted out of the water current easily through an operation done by manpower.

Solution to Problem

A hydroelectric power generation apparatus according to the present invention comprises a hydroelectric power generation module, a supporting part, and a bar. The hydroelectric power generation module includes a rotary blade and a power generator that generates power by rotation of the rotary blade. The supporting part supports the hydroelectric power generation module. The supporting part can be installed at the water channel. The bar is connected to the supporting part so as to protrude from the supporting part. With the bar's one end closer to the supporting part or a portion of the supporting part serving as a center, the other end of the bar opposite to one end of the bar can be pivoted to switch a first state to a second state and vice versa. In the first state, the hydroelectric power generation module has the rotary blade below the surface of the water in the water channel. In the second state, the hydroelectric power generation module has the rotary blade above the surface of the water in the water channel.

Advantageous Effects of Invention

The present invention can provide a hydroelectric power generation apparatus that can be easily lifted out of a water current without requiring a large-scale device.

BRIEF DESCRIPTION OF DRAWINGS

FIG. 19 is a schematic diagram for illustrating a hydroelectric power generation apparatus according to a fifth embodiment of the present invention.

DESCRIPTION OF EMBODIMENTS

Embodiments of the present invention will now be described with reference to the drawings. In the figures, identical or corresponding components are identically denoted and wilt not be described redundantly.

First Embodiment

<Configuration of Hydroelectric Power Generation Apparatus>

Figure 1:
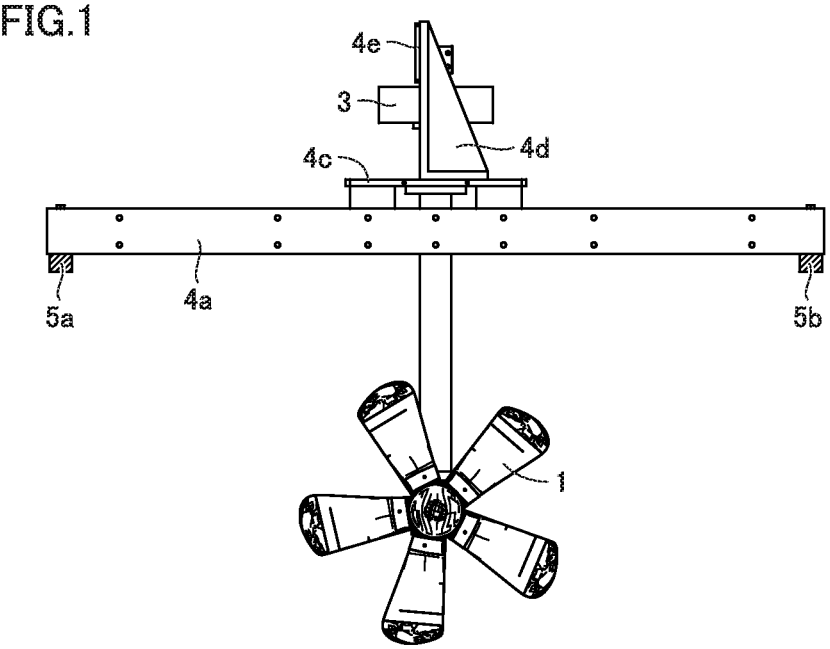
FIG. 1 is a schematic front view of a hydroelectric power generation apparatus according to a first embodiment of the present invention.
Figure 2:
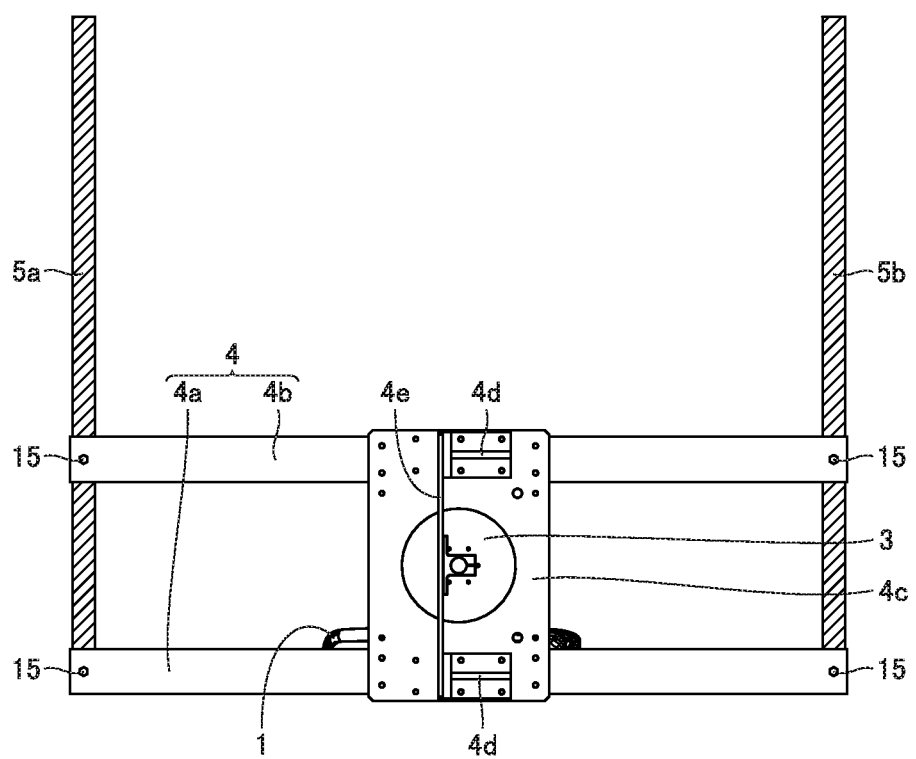
FIG. 2 is a schematic top view of the hydroelectric power generation apparatus shown in FIG. 1
Figure 3:
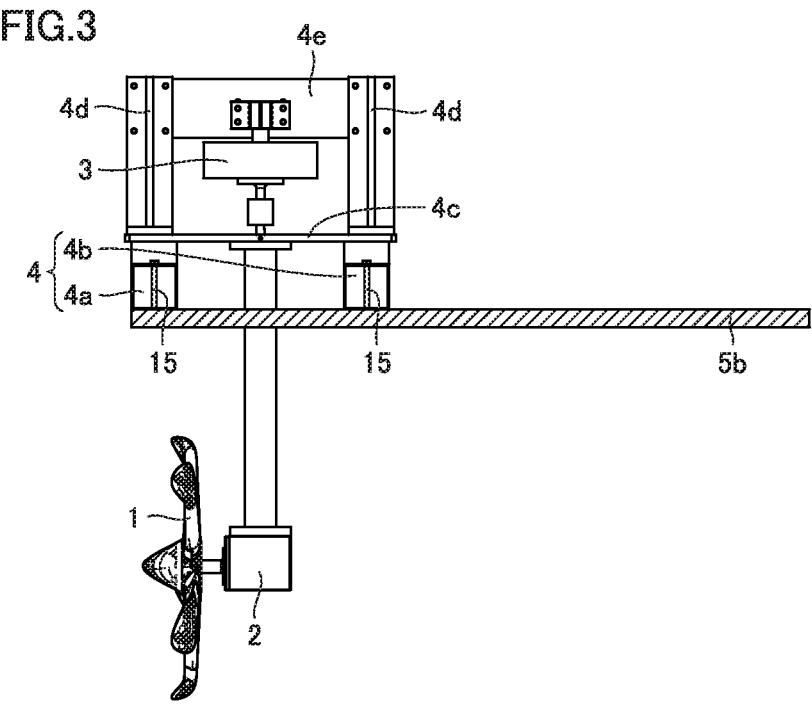
FIG. 3 is a schematic side view of the hydroelectric power generation apparatus shown in FIG. 1.

FIGS. 1 to 3 are schematic diagrams for illustrating a hydroelectric power generation apparatus according to the present embodiment. A configuration of the hydroelectric power generation apparatus according to the present embodiment will be described with reference to FIGS. 1 to 3.

The hydroelectric power generation apparatus shown in FIGS. 1 to 3 is a compact and lightweight system installed in an existing water channel for agricultural water, city water, industrial water, and the like and utilizing kinetic energy of running water for power generation. As shown in FIGS. 1 to 4, the hydroelectric power generation apparatus comprises a hydroelectric power generation module including a rotary blade 1, a supporting part including a beam 4, bars 5a, 5b, and a control device. Bars 5a, 5b can be used to lift the hydroelectric power generation module of the hydroelectric power generation apparatus out of a water channel, as will be described hereinafter. The details will be described hereinafter. The hydroelectric power generation module includes rotary blade 1, a gear box 2, and a power generator 3. Rotary blade 1 is a horizontal-axis-type, propeller-type rotary blade. Gear box 2 is connected to rotary blade 1. Power generator 3 is connected to gear box 2 via a support. When rotary blade 1 is rotated by a water current, the rotation of rotary blade 1 is transmitted to power generator 3 via gear box 2 and the support. Power generator 3 generates power by the rotation of rotary blade 1.

The control device controls the output of power generator 3 and rotary blade 1. Maximum power extracted from power generator 3 varies depending on the flow velocity of the water current. Accordingly, the control device measures the flow velocity of the water current, the rotation speed of rotary blade 1, or the power generation voltage of power generator 3, and determines an optimum current value allowing a maximum power to be extracted from power generator 3. Then, the control device controls the hydroelectric power generation module so that the amount of the current of power generator 3 matches the optimum value.

The supporting part supports the hydroelectric power generation module. The supporting part includes two beams 4a and 4b, a mount 4c, a support 4d, and a base plate 4e. The two beams 4a and 4b are aligned in parallel. At the center portions of the two beams 4a, 4b, mount 4c is disposed to connect the two beams 4a, 4b. Mount 4c is fixed to beams 4a. 4b. On an upper surface of mount 4c, two supports 4d are disposed with a spacing therebetween. The two supports 4d are each disposed at an end of mount 4c. Further, supports 4d are positioned to overlap beams 4a, 4b in plan view. Base plate 4e is disposed to connect between the two supports 4d. Power generator 3 is fixed to base plate 4e. Power generator 3 is disposed between mount 4c and base plate 4e. The support of the hydroelectric power generation module has one end connected to a lower surface of mount 4c.

Bars 5a, 5b serving as lifting bars are fixed to beams 4a, 4b with a bolt 15. Bar 5a is connected to each beam 4a, 4b at one end. Bar 5b is connected to each beam 4a, 4b at the other end opposite to one end. Bars 5a and 5b extend in a direction traversing a direction in which beams 4a and 4b extend, and for example it is a direction orthogonal to beams 4a and 4b.

Bars 5a, 5b are detachably connected to beams 4a, 4b with bolt 15 constituting a connecting member. Specifically, beams 4a, 4b each have opposite ends each with a hole formed therethrough to pass bolt 15 therethrough. In addition, bars 5a and 5b each also have a hole formed therein to receive bolt 15. Bars 5a, 5b are positioned with respect to beams 4a, 4b so that the holes of bars 5a, 5b overlap the holes of beams 4a, 4b. The hydroelectric power generation apparatus shown in FIGS. 1 to 3 has bars 5a and 5b disposed to be in contact with lower surfaces of beams 4a and 4b. Then, bolts 15 are passed through the holes of bars 5a, 5b and those of beams 4a, 4b. Thereafter, a nut constituting the connecting member is fixed to bolt 15 to fix bars 5a, 5b to beams 4a, 4b via bolt 15. In this manner, bars 5a and 5b are detachably connected to beams 4a and 4b. Bars 5a and 5b can be removed from beams 4a and 4b by decoupling bolt 15 and the nut. Accordingly, bars 5a and 5b are connected to beams 4a and 4b only when lifting the hydroelectric power generation apparatus out of the water channel, as will be described hereinafter.

<Method for Lifting the Hydroelectric Power Generation Apparatus>

FIGS. 4 to 8 are schematic diagrams for illustrating a method for lifting the FIGS. 1-3 hydroelectric power generation apparatus out of a water channel. With reference to FIGS. 4 to 8, the method for lifting the hydroelectric power generation apparatus out of the water channel will be described.

Figure 4:
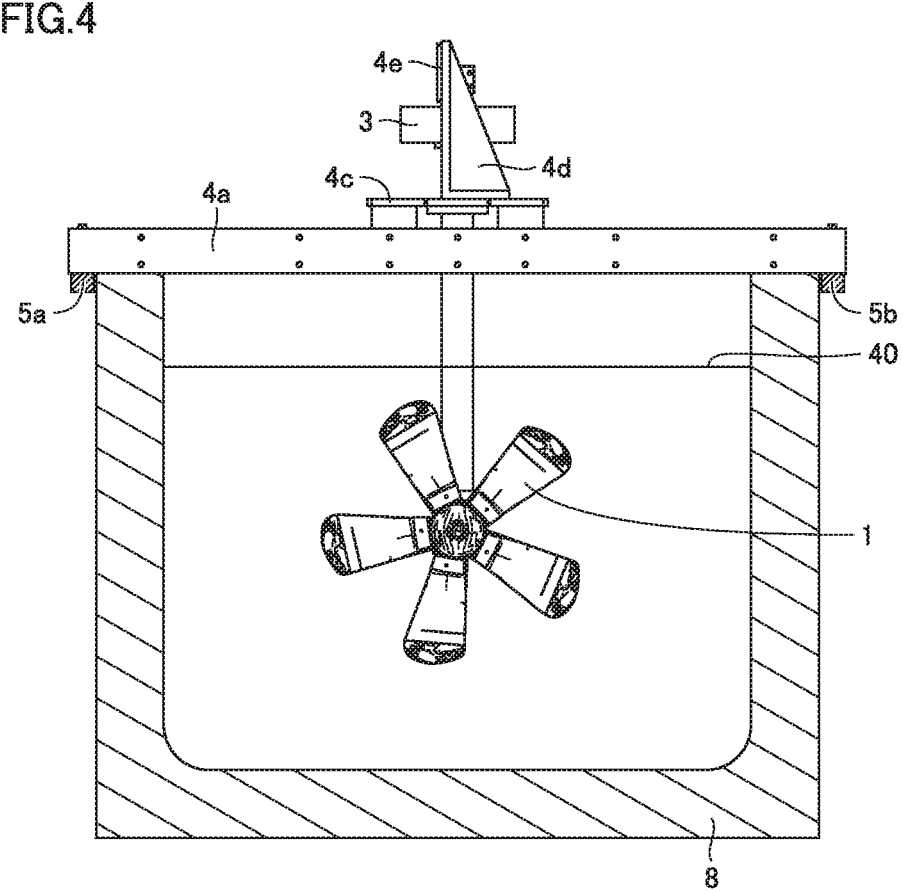
FIG. 4 is a schematic front view for illustrating the FIG. 1 hydroelectric power generation apparatus installed in a water channel.
Figure 5:
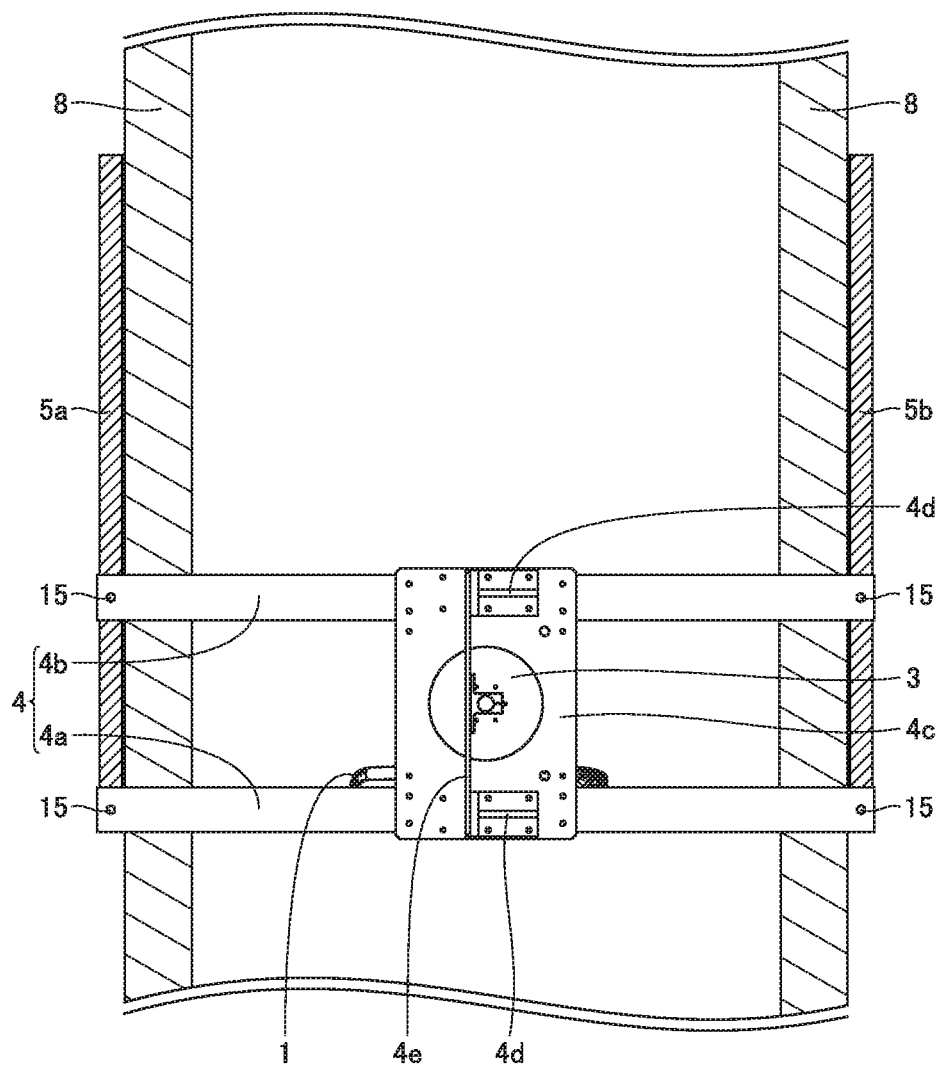
FIG. 5 is a schematic top view of the hydroelectric power generation apparatus shown in FIG. 4
Figure 6:
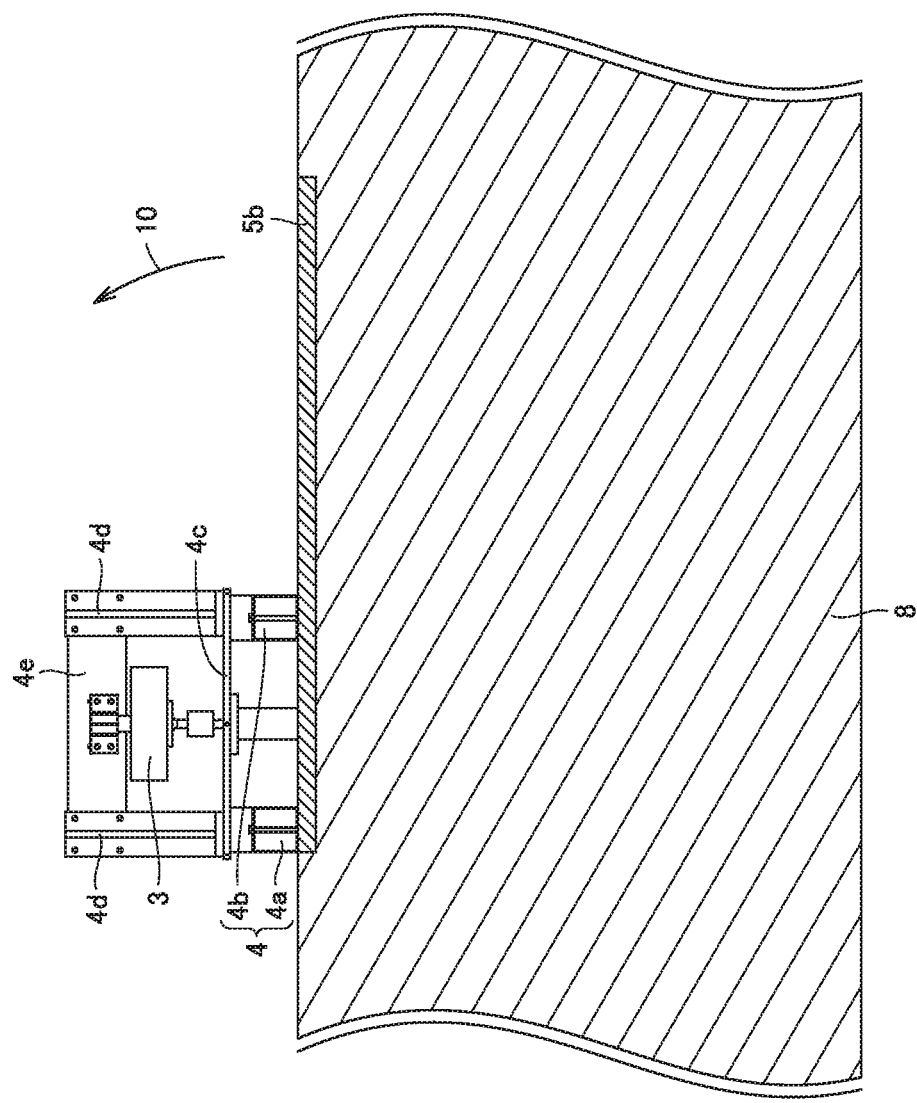
FIG. 6 is a schematic side view of the hydroelectric power generation apparatus shown in FIG. 4.

Initially, as shown in FIGS. 4 to 6, the hydroelectric power generation apparatus is disposed in the water channel at a predetermined position. At the time, the hydroelectric power generation module has rotary blade 1 below the water surface 40 of the water channel (i.e., the first state). Although the position of water surface 40 varies with the time of year, adjustment can be done each time to assume the first state. Furthermore, the hydroelectric power generation apparatus has beams 4a, 4b with their ends in contact with an upper surface of a wall portion 8 of the water channel. Beams 4a and 4b have their extremities protruding to be outer than an outer peripheral surface of wall portion 8 of the water channel. Bars 5a and 5b are connected to the extremities of beams 4a and 4b. Bars 5a, 5b are disposed to extend along water surface 40 of the water channel or along the upper surface of wall portion 8 of the water channel.

Subsequently, ends of bars 5a and 5b (i.e., the other end of each bar opposite to one end thereof connected to beams 4a and 4b) are lifted in a direction indicated by an arrow 10 shown in FIG. 6. As a result, the hydroelectric power generation apparatus rotates about a portion at which beams 4a, 4b are in contact with wall portion 8 of the water channel. Providing bars 5a, 5b with a sufficient length (for example of 3 m or more and 5 m or less) allows the other ends of bars 5a, 5b to be lifted with a sufficiently small force. This allows the other ends of bars 5a and 5b to be lifted through a work done by one to several workers.

While in the above configuration a center of rotation when lifting, the other ends of bars 5a, 5b is a portion at which beams 4a, 4b are in contact with wall portion 8 of the water channel, the center of rotation may be one end of each bar 5a, 5b located closer to beam 4a.

By thus lifting the other ends of bars 5a, 5b in the direction of arrow 10 (see FIG. 6), the hydroelectric power generation apparatus can be rotated in the direction indicated by arrow 10. As a result, when bars 5a, 5b are pivoted by substantially 90 degrees, as shown in FIGS. 7 and 8, the hydroelectric power generation apparatus can be rotated by 90 degrees to lift the hydroelectric power generation module of the hydroelectric power generation apparatus above the water surface of the water channel.

While the hydroelectric power generation apparatus described above has beams 4a and 4b disposed directly on wall portion 8 of the water channel, bars 5a and 5b may also be applied to a hydroelectric power generation apparatus of a different configuration. For example, a configuration in which a foundation for a hydroelectric power generation apparatus is separately formed on opposite sides of a water channel and beams 4a, 4b are mounted on that foundation may also similarly have bars 5a, 5b connected to beams 4a, 4b. This case also allows the hydroelectric power generation module of the hydroelectric power generation apparatus to be lifted out of the water channel by lifting the other ends of bars 5a, 5b.

Figure 7:
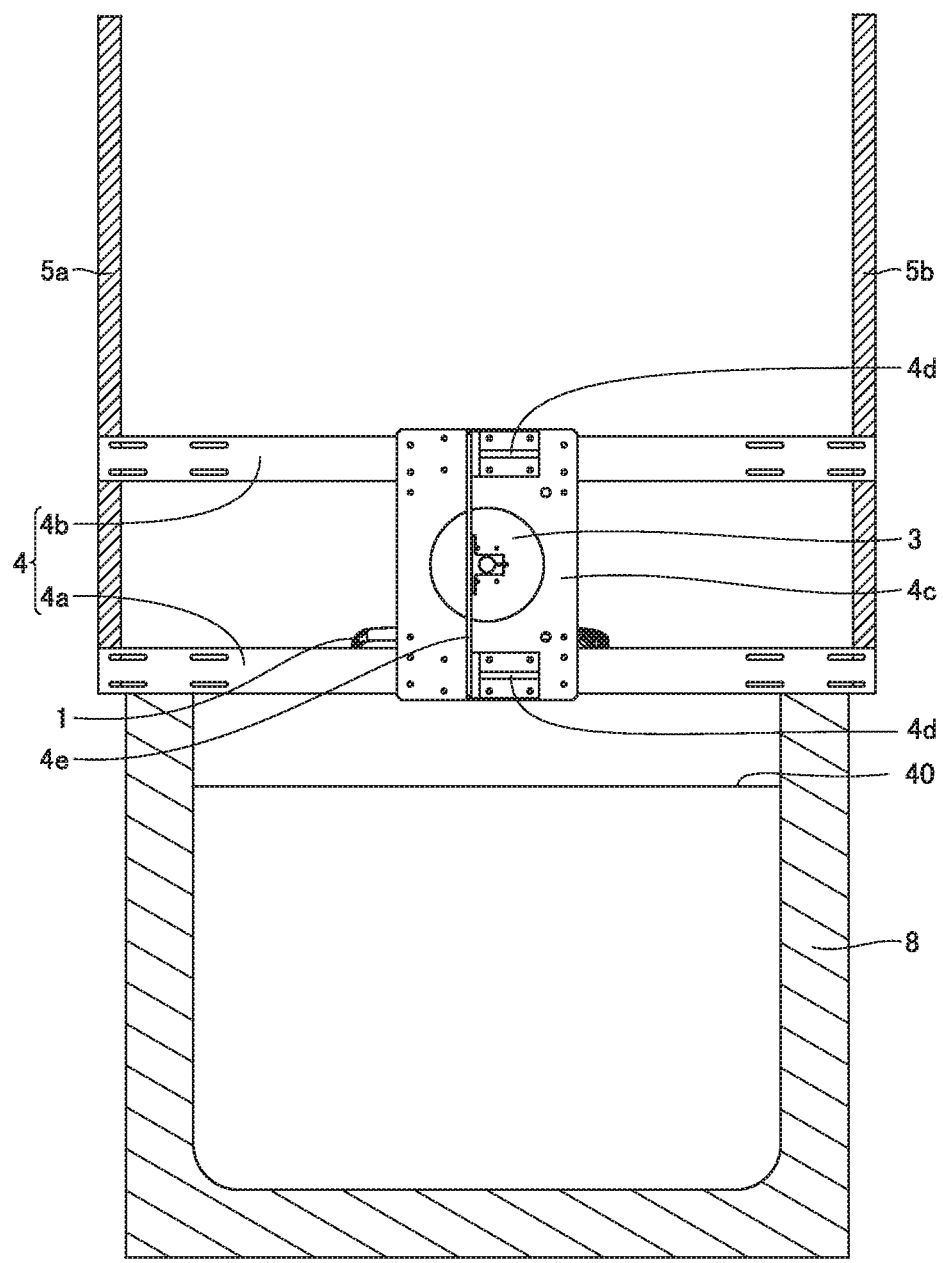
FIG. 7 is a schematic front view for illustrating the FIG. 4 hydroelectric power generation apparatus lifted above a water surface of a water channel.
Figure 8:
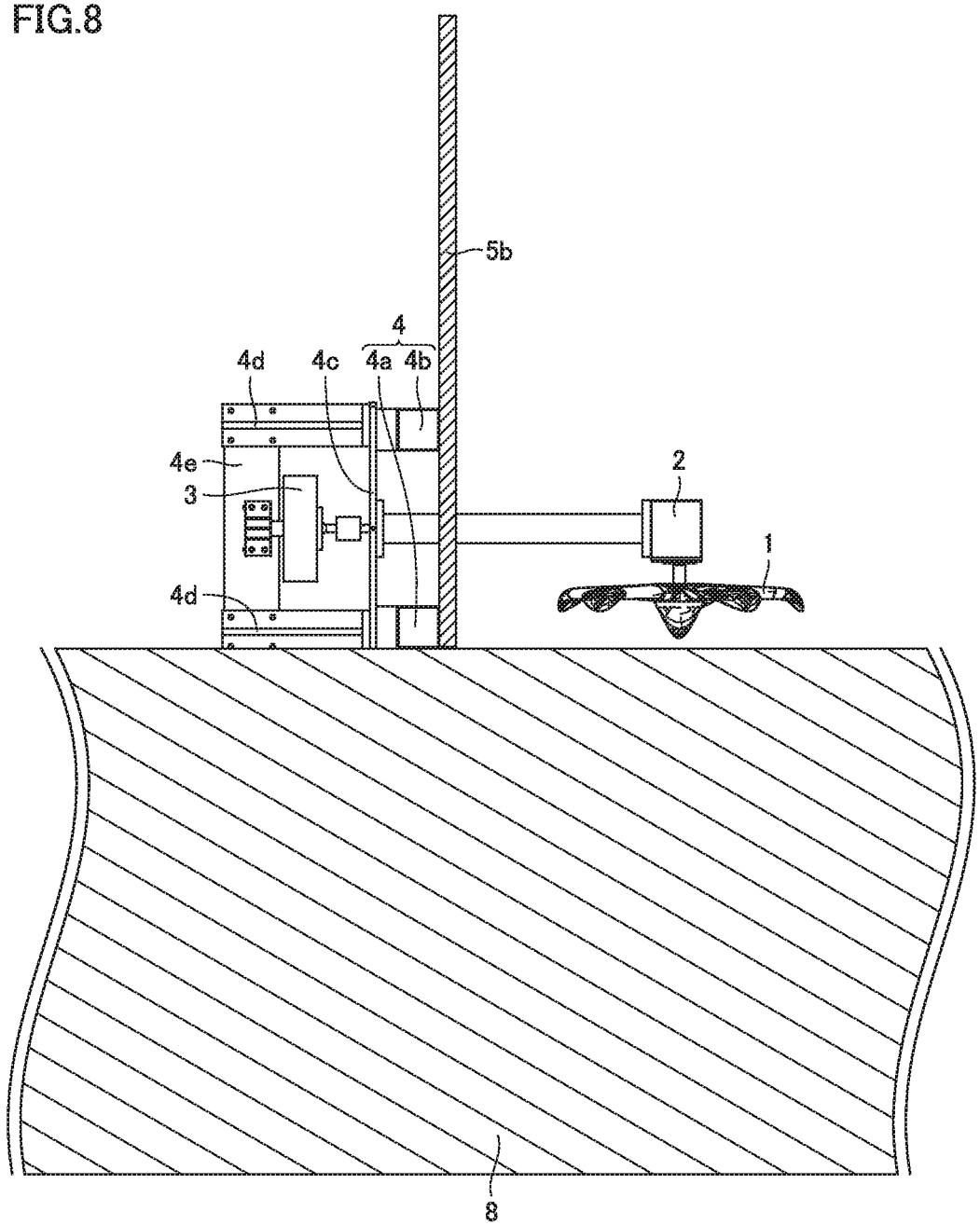
FIG. 8 is a schematic side view of the hydroelectric power generation apparatus shown in FIG. 7.

Further, while, as shown in FIGS. 7 and 8, a case where the hydroelectric power generation apparatus is lifted above water with rotary blade 1 facing downward has been described, which side rotary blade 1 (and hence the hydroelectric power generation apparatus) faces when the apparatus is lifted above water may be changed in consideration of ease of maintenance and the like. For example, bars 5a and 5b may be connected to beams 4a and 4b to extend toward a side where rotary blade 1 is located when viewed at gearbox 2 in FIG. 3. In that case, by lifting those ends of the bars farther from beams 4a, 4b, the hydroelectric power generation apparatus can be lifted out of the water channel. The hydroelectric power generation apparatus thus lifted has rotary blade 1 facing upward.

<Operation of Hydroelectric Power Generation Apparatus>

The hydroelectric power generation apparatus fixed to the water channel has its rotary blade rotated by a current of water flowing through the water channel. The rotary blade generates rotational energy which is in turn transmitted to power generator 3 via gear box 2, a rotation shaft disposed inside the support, and the like. Power generator 3 receives the transmitted rotational energy and converts it into electrical energy. The electrical energy generated by power generator 3 is externally output through an output line or the like.

<Characteristic Configuration, and Function and Effect>

The above-described hydroelectric power generation apparatus comprises a hydroelectric power generation module, a supporting part (beams 4a, 4b, mount 4c, support 4d, and base plate 4e), and bars 5a, 5b. The hydroelectric power generation module includes rotary blade 1 and power generator 3 that generates power by rotation of rotary blade 1. The supporting part supports the hydroelectric power generation module. The supporting part can be installed at a water channel. Bars 5a, 5b are connected to the supporting part to protrude from the supporting part. With one end of each bar 5a, 5b closer to the supporting part or a portion of the supporting part serving as a center, the other end of each bar 5a, 5b opposite to one end thereof can be pivoted to switch a first state to a second state and vice versa. In the first state, as shown in FIG. 4, the hydroelectric power generation module has rotary blade 1 below the surface of the water in the water channel. In the second state, as shown in FIG. 8, the hydroelectric power generation module has rotary blade 1 above the surface of the water in the water channel.

Thus, by lifting the other ends of bars 5a, 5b, the hydroelectric power generation apparatus can be rotated about beams 4a, 4b. Further, by making bars 5a and 5b sufficiently long, a large distance can be provided between the center of rotation and the other ends to allow the hydroelectric power generation apparatus to be rotated with a relatively small force through leverage. Thus, without using a large-scale device using a pulley or a rope, and instead by a work such as lifting the other ends of bars 5a, 5b by manpower, the hydroelectric power generation apparatus can be easily lifted out of the water channel in a short period of time.

For example, when heavy rain or the like results in the water channel having a raised water level, and accordingly, the hydroelectric power generation apparatus according to the present embodiment needs to be lifted out of a water current, the hydroelectric power generation apparatus according to the present embodiment can be lifted out of the water current without using a crane vehicle or the like. Further, the hydroelectric power generation apparatus does not require a large-scale device for an operation of lifting the apparatus, and can be manufactured and installed at a reduced cost. In addition, the operation of lifting the apparatus can be done with man power and thus no particular driving force is required, and a large degree of freedom can be obtained in where the hydroelectric power generation apparatus is installed.

The hydroelectric power generation apparatus may further comprise a connecting member (bolt 15 and a nut) to detachably connect bars 5a, 5b to the supporting part. In that case, bars 5a, 5b can be connected to beams 4a, 4b only when the hydroelectric power generation apparatus is lifted out of the water channel. Further, a direction which bars 5a, 5b have with respect to beams 4a, 4b when the former are connected to the latter can be changed, as appropriate, so that rotary blade 1 faces a desired side when the hydroelectric power generation apparatus is lifted out of the water channel.

Second Embodiment

<Configuration of Hydroelectric Power Generation Apparatus>

Figure 9:
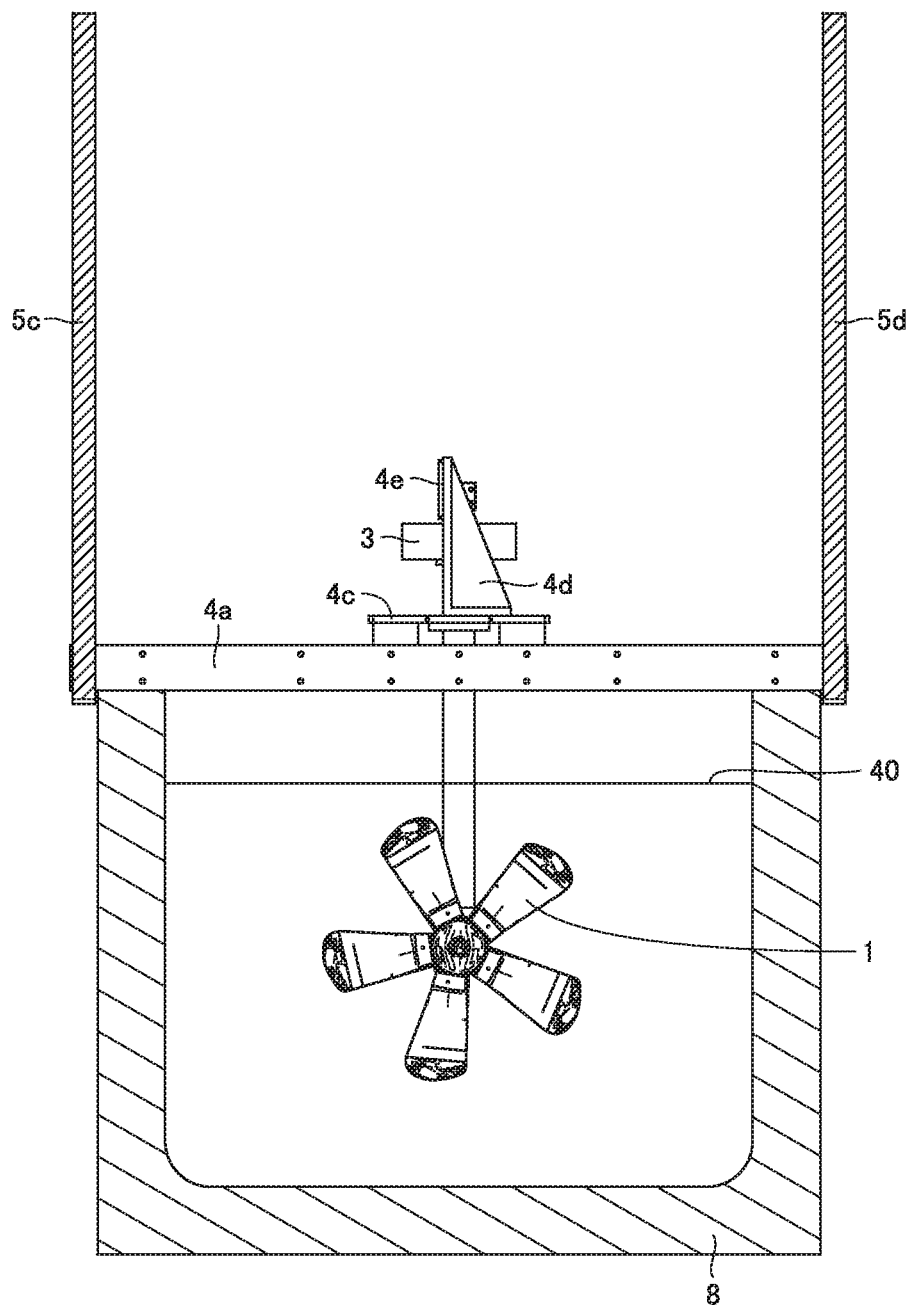
FIG. 9 is a schematic front view for illustrating a hydroelectric power generation apparatus according to a second embodiment of the present invention.
Figure 10:
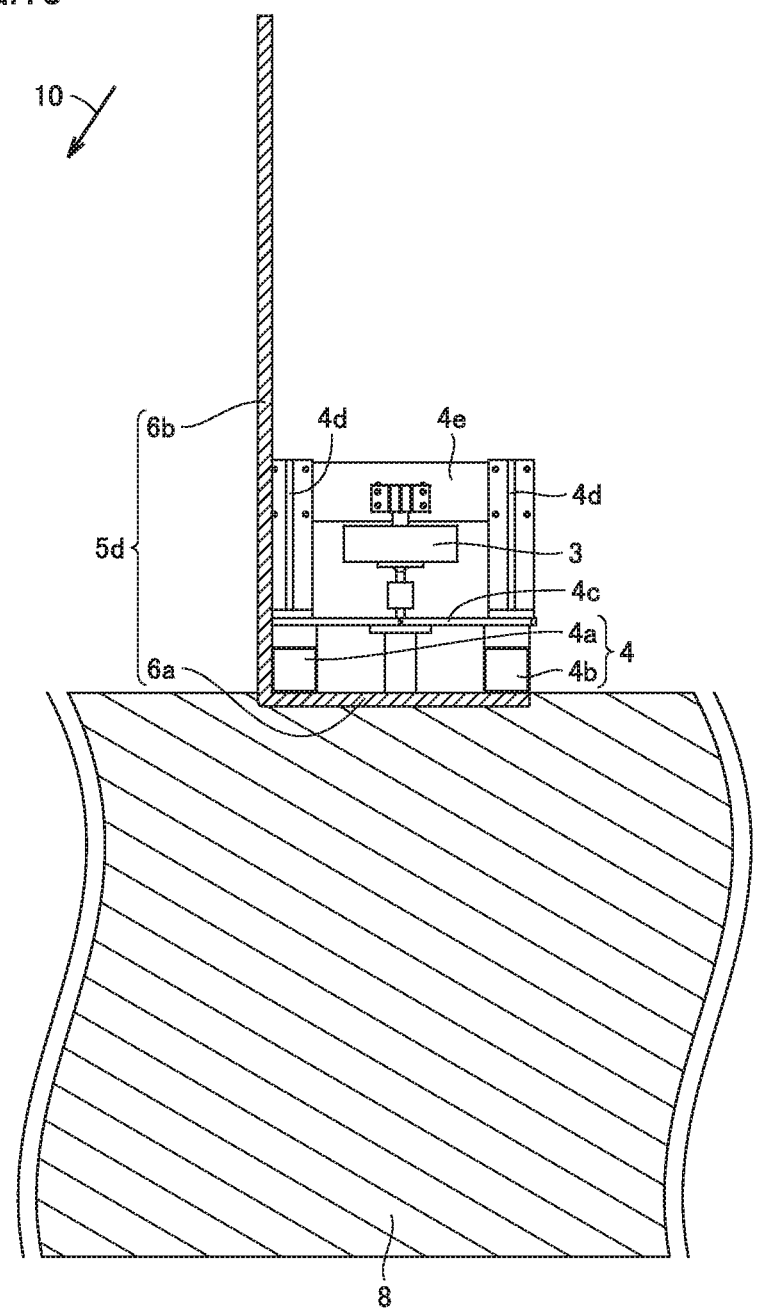
FIG. 10 is a schematic side view of the hydroelectric power generation apparatus shown in FIG. 9.
Figure 11:
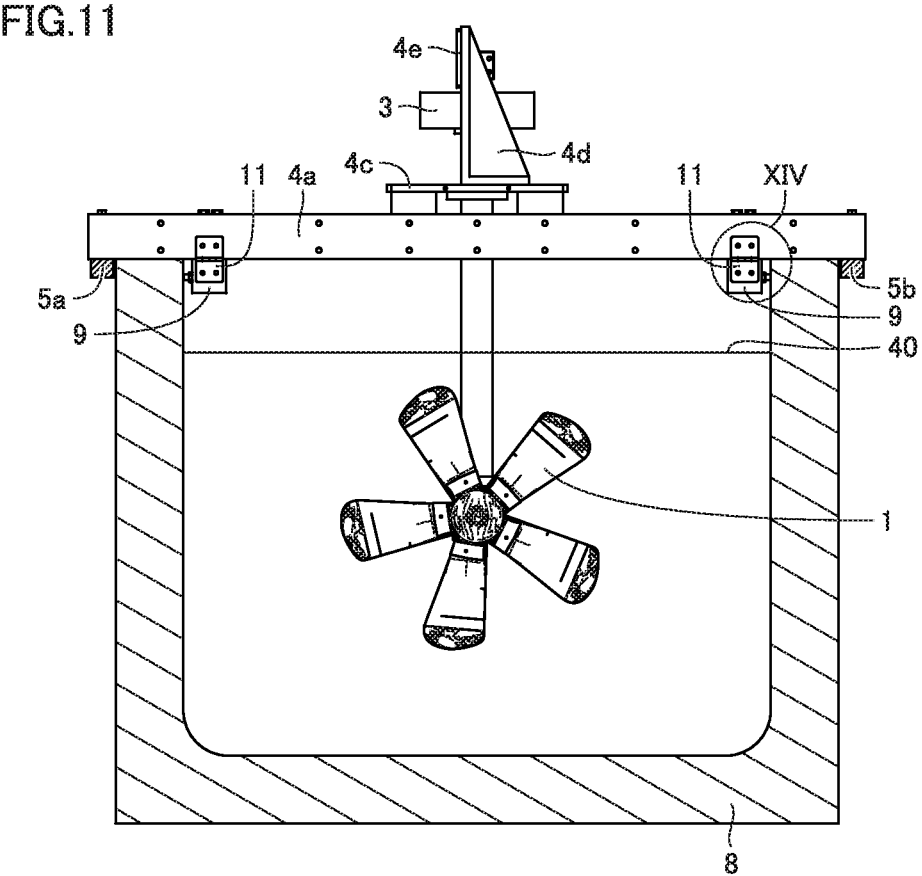
FIG. 11 is a schematic front view for illustrating a hydroelectric power generation apparatus according to a third embodiment of the present invention.
Figure 12:
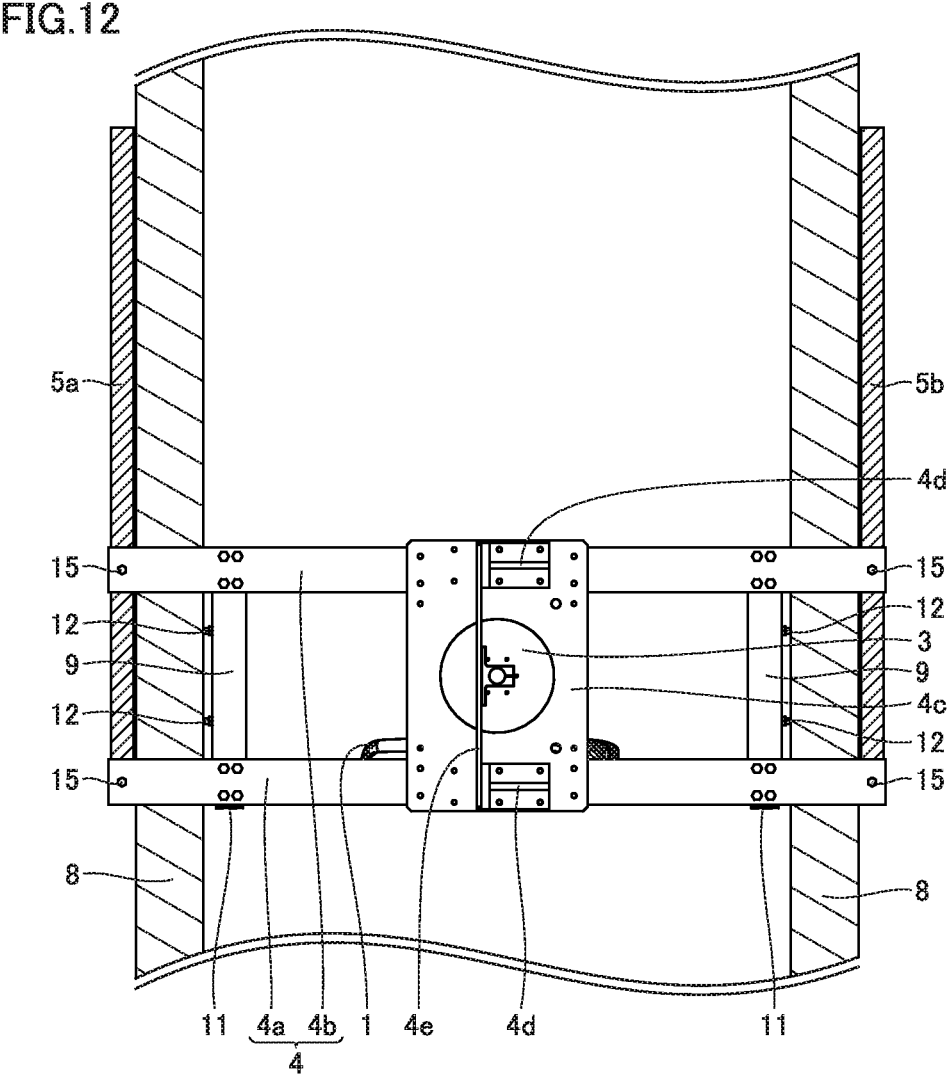
FIG. 12 is a schematic top view of the hydroelectric power generation apparatus shown in FIG. 11

FIGS. 9 and 10 are schematic diagrams for illustrating a hydroelectric power generation apparatus according to the present embodiment. The hydroelectric power generation apparatus according to the present embodiment will be described with reference to FIGS. 9 and 10. Note that FIG. 9 corresponds to FIG. 4 and FIG. 10 corresponds to FIG. 6.

The hydroelectric power generation apparatus shown in FIGS. 9 and 10 basically has the same structure as the hydroelectric power generation apparatus shown in FIGS. 1-3, except that the former has bars 5c, 5d different in shape than the latter. The hydroelectric power generation apparatus shown in FIGS. 9 and 10 has bars 5c and 5d in the form of the letter L when viewed laterally. Specifically, bar 5d includes a fixed portion 6a and an extending portion 6b. Fixed portion 6a, in the first state with rotary blade 1 below the water surface of the water channel, as shown in FIGS. 9 and 10, is disposed to extend along the water surface of the water channel and also fixed to beams 4a and 4b. Extending portion 6b is connected to fixed portion 6a and extends in a direction different from the direction in which fixed portion 6a extends. Specifically, extending portion 6b extends in a direction in which the hydroelectric power generation module extends.

<Method for Lifting the Hydroelectric Power Generation Apparatus>

The method for lifting the FIGS. 9 and 10 hydroelectric power generation apparatus from a water channel is basically the same as the method described with reference to FIGS. 4 to 8, except that the former differs from the latter in that in the former, extending portions 6b of bars 5c, 5d are pulled down in a direction indicated by arrow 10 shown in FIG. 10. In that case, the hydroelectric power generation apparatus is rotated about beam 4a adjacent to a portion of each bar 5c, 5d connecting fixed portion 6a and extending portion 6b together. This case also allows the hydroelectric power generation apparatus to be easily lifted out of the water channel, as well as the method of lifting the same as shown in FIGS. 4 to 8.

Third Embodiment

<Configuration of Hydroelectric Power Generation Apparatus>

FIGS. 11 to 14 are schematic diagrams for illustrating a hydroelectric power generation apparatus according to the present embodiment. The hydroelectric power generation apparatus according to the present embodiment will be described with reference to FIGS. 11 to 14. Note that FIGS. 11 to 13 correspond to FIGS. 4 to 6.

The hydroelectric power generation apparatus shown in FIGS. 11-14 basically has the same structure as that shown in FIGS. 1 to 3, except that the former differs from the latter in that a fixing device 9 is connected to beams 4a and 4b constituting the supporting part and a hinge 11 is disposed to connect an end surface of fixing device 9 and a side surface of beam 4a.

Figure 14:
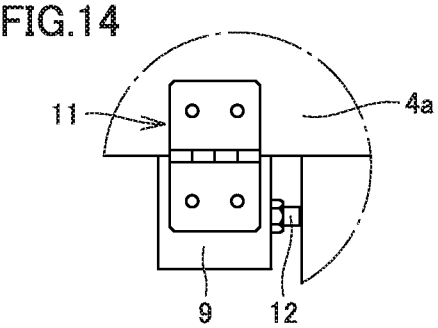
FIG. 14 is an enlarged schematic diagram of a region XIV shown in FIG. 11.

Fixing device 9 is disposed to connect between beams 4a and 4b at opposite end sides of beams 4a and 4b. In other words, fixing device 9 is disposed to extend in a direction traversing a direction in which beams 4a and 4b extend. Fixing device 9 has, for example, a columnar shape. Normally, fixing device 9 is fixed to beams 4a and 4b by a fixing member such as a bolt. In contrast, as will be described hereinafter, when lifting the hydroelectric power generation apparatus, the bolt fixing device 9 to beams 4a and 4b is removed. Further, fixing device 9 is disposed at a position facing an inner peripheral surface await portion 8 of the water channel. As shown in FIG. 14, fixing device 9 is fixed to wall portion 8 of the water channel by a fixing member such as an anchor bolt 12 or the like.

Hinge 11 is disposed to connect the end surface of fixing device 9 and the side surface of beam 4a. Hinge 11 is fixed to the end surface of fixing device 9 and the side surface of beam 4a. When fixing device 9 is not bolted to beams 4a, 4b, the hydroelectric power generation apparatus can be moved (or rotated) in such a manner that the side surface of beam 4a is inclined with respect to the end surface of fixing device 9 with hinge 11 serving as a center.

<Method for Lifting the Hydroelectric Power Generation Apparatus>

Figure 13:
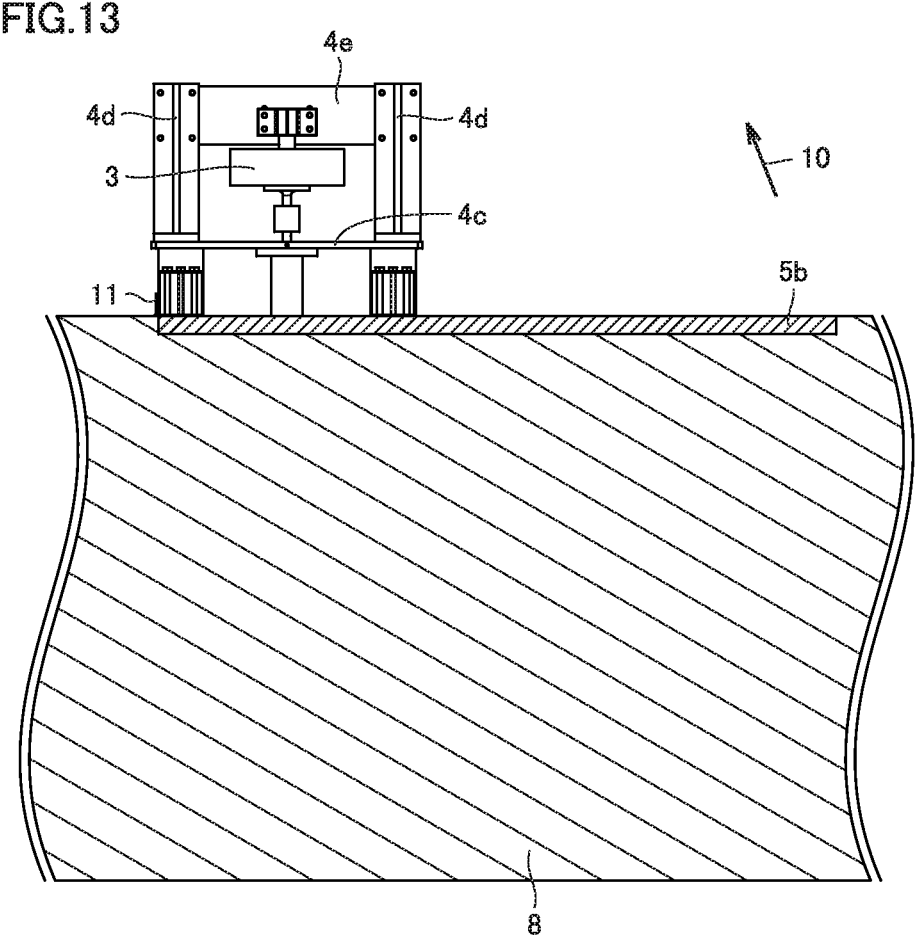
FIG. 13 is a schematic side view of the hydroelectric power generation apparatus shown in FIG. 11.

The method for lifting the FIGS. 11-14 hydroelectric power generation apparatus from a water channel is basically the same as the method described with reference to FIGS. 4 to 8, except that the former differs from the latter in that in the former, the bolts connecting fixing device 9 and beams 4a and 4b together are previously removed and thereafter, the other ends of bars 5a and 5b are lifted in the direction indicated by arrow 10 in FIG. 13, and the hydroelectric power generation apparatus is rotated about hinge 11. That is, the center about which the above hydroelectric power generation apparatus is rotated includes a supporting member (or hinge 11) that supports the hydroelectric power generation module rotatably with respect to the water channel.

This case also allows the hydroelectric power generation apparatus to be easily lifted out of the water channel, as well as the method of lifting the same as shown in FIGS. 4 to 8. Further, fixing device 9 is fixed to wall portion 8 of the water channel by anchor bolt 12, and when lifting the other ends of bars 5a, 5b the hinge serving as the center of rotation is not positionally displaced. The hydroelectric power generation apparatus can thus be lifted out of the water channel through a safe and reliable operation.

Fourth Embodiment

<Configuration of Hydroelectric Power Generation Apparatus>

FIGS. 15 to 18 are schematic diagrams for illustrating a hydroelectric power generation apparatus according to the present embodiment. The hydroelectric power generation apparatus according to the present embodiment will be described with reference to FIGS. 15 to 18. Note that FIGS. 15 to 17 correspond to FIGS. 4 to 6.

The hydroelectric power generation apparatus shown in FIGS. 15-18 basically has the same structure as that shown in FIGS. 1-3, except that the former differs from the latter in that beam 4a constituting the supporting part includes a shaft 21, and shaft 21 is supported by a bearing unit 20, and that bars 5a and 5b are disposed on a side inner than the wall portion of the water channel.

Figure 18:
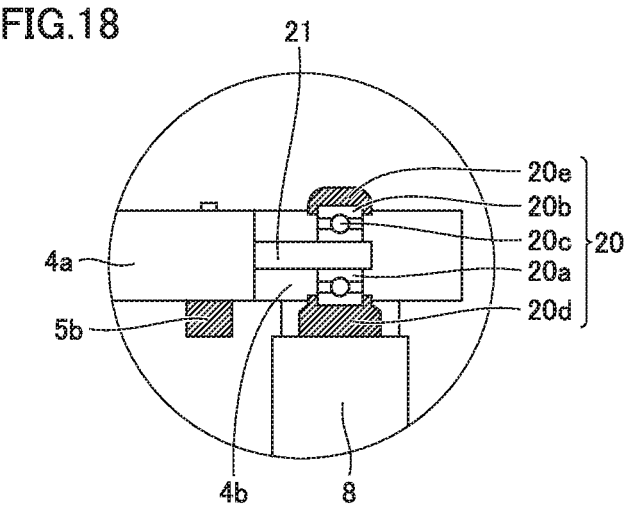
FIG. 18 is an enlarged schematic diagram of a region XVIII shown in FIG. 15.

Shaft 21 is connected to each of opposite ends of beam 4a to extend in a direction in which beam 4a extends, Bearing unit 20 supports shaft 21. Two bearing units 20 are disposed to sandwich beam 4a therebetween. Bearing unit 20 is fixed on an upper surface of wall portion 8 of the water channel. As shown in FIG. 18, bearing unit 20 includes an inner race 20a, a rolling element 20c, an outer race 20b, and a housing 20d. Inner race 20a has an annular shape. Inner race 20a has an inner circumferential surface fixed in contact with an outer circumferential surface of shaft 21.

Inner race 20a, outer race 20b, and rolling element 20c constitute a bearing. Housing 20d holds the bearing. Specifically, housing 20d is disposed to surround an outer circumference of outer race 20b. Housing 20d is fixed to an upper surface of wall portion 8 of the water channel. Shaft 21 is rotatably supported by bearing unit 20. As a result, when the hydroelectric power generation apparatus is lifted out of the water channel, the hydroelectric power generation apparatus can be rotated about shaft 21 and beam 4a, as will he described hereinafter.

Bars 5a, 5b are connected to beams 4a, 4b on an inner peripheral side of the water channel. Bars 5a, 5b are disposed to extend along an internal wall surface of wall portion 8 of the water channel.

Figure 15:
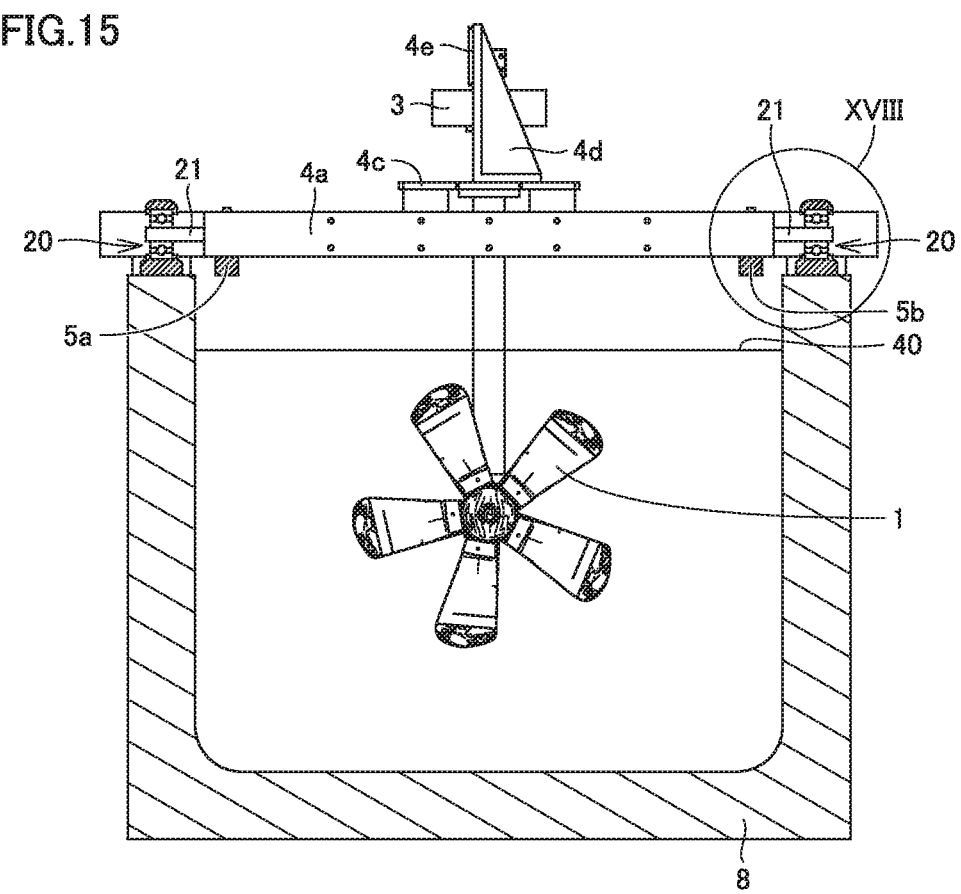
FIG. 15 is a schematic front view for illustrating a hydroelectric power generation apparatus according to a fourth embodiment of the present invention.
Figure 16:
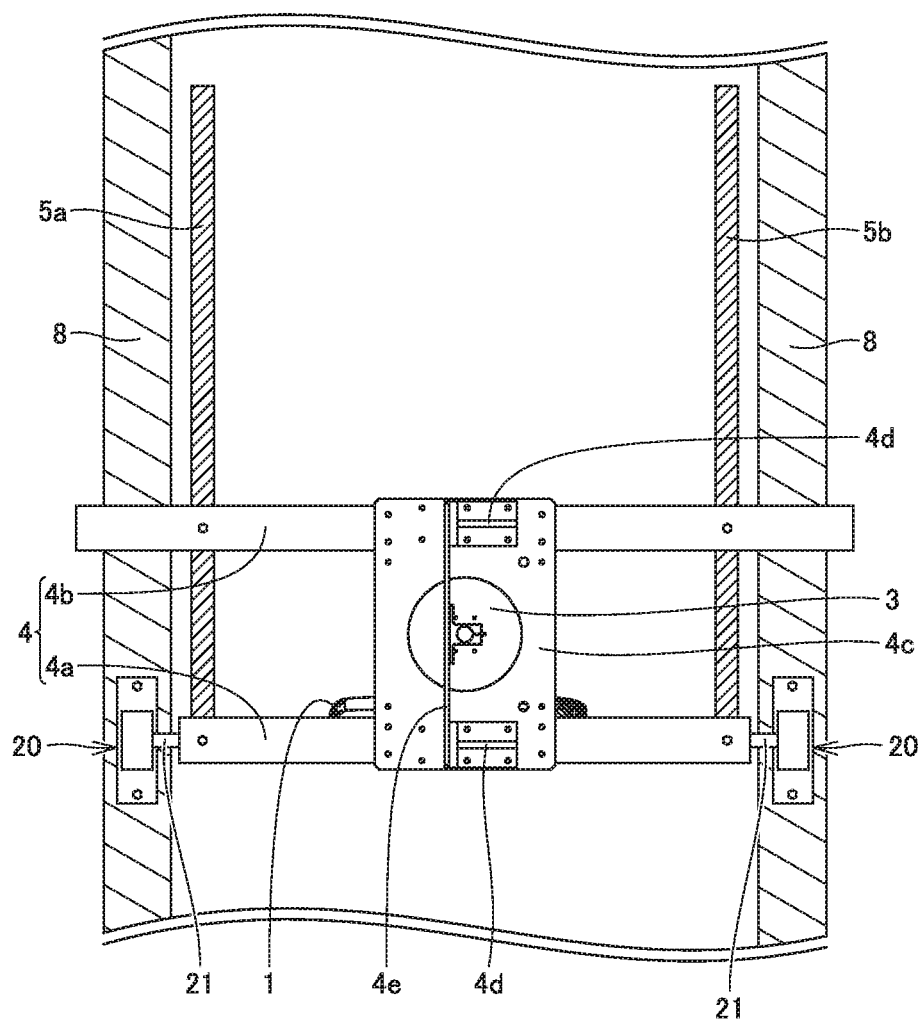
FIG. 16 is a schematic top view of the hydroelectric power generation apparatus shown in FIG. 15
Figure 17:
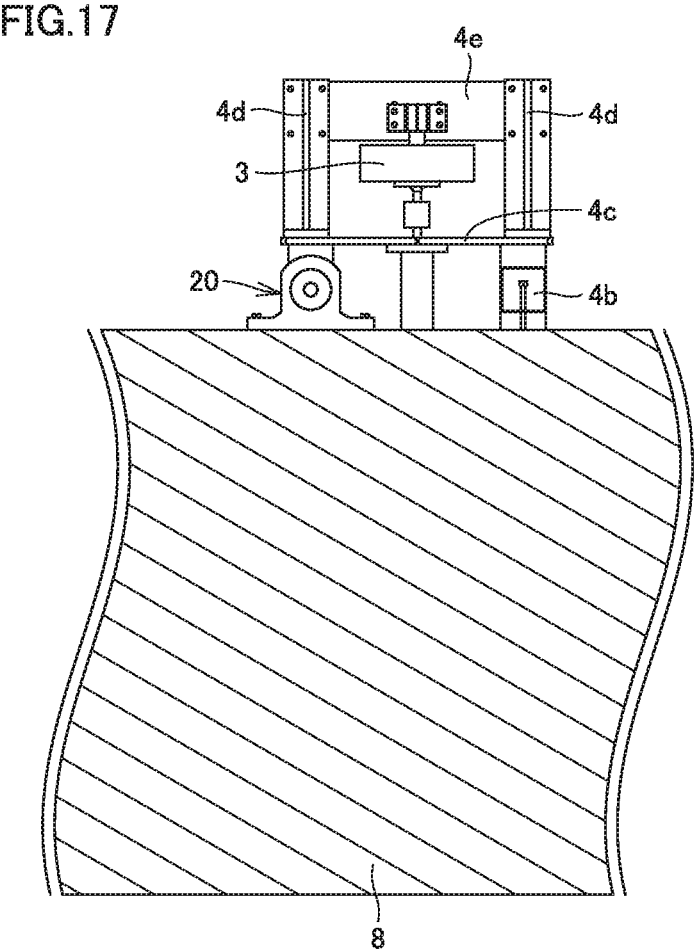
FIG. 17 is a schematic side view of the hydroelectric power generation apparatus shown in FIG. 15.

While bearing unit 20 is connected to the upstream beam 4a, as shown in FIG. 15 or the like, it may alternatively be connected to the downstream beam 4b in consideration of workability and the like.

<Method for Lifting the Hydroelectric Power Generation Apparatus>

The method for lifting the FIGS. 15-18 hydroelectric power generation apparatus from a water channel is basically the same as the method described with reference to FIGS. 4-8, except that the former differs from the latter in that the hydroelectric power generation apparatus is rotated about bearing unit 20. That is, the center about which the above hydroelectric power generation apparatus is rotated includes a supporting member (or bearing unit 20) that supports the hydroelectric power generation module rotatably with respect to the water channel.

This case also allows the hydroelectric power generation apparatus to be easily lifted out of the water channel, as well as the method of lifting the same as shown in FIGS. 4 to 8. Further, bearing unit 20 is fixed to wall portion 8 of the water channel by a fixing member such as anchor bolt 12, and when lifting the other ends of bars 5a, 5b, bearing unit 20 serving as a center of rotation, shaft 21 and beam 4a are not positionally displaced with respect to the water channel. The hydroelectric power generation apparatus can thus be lifted out of the water channel through a safe and reliable operation.

Fifth Embodiment

<Configuration of Hydroelectric Power Generation Apparatus>

FIG. 19 is a schematic diagram for illustrating a hydroelectric power generation apparatus according to the present embodiment. The hydroelectric power generation apparatus according to the present embodiment will be described with reference to FIG. 19. Note that FIG. 19 corresponds to FIG. 1.

The hydroelectric power generation apparatus shown in FIG. 19 basically has the same structure as the hydroelectric power generation apparatus shown in FIGS. 1-3, except that the former has a rotary blade different in shape than the latter. The hydroelectric power generation apparatus shown in FIG. 19 does not have a horizontal-axis-type, propeller-type rotary blade and instead has a vertical-axis-type rotary blade 30. This configuration can also achieve an effect similar to that of the hydroelectric power generation apparatus shown in FIGS. 1-3.

The above-described hydroelectric power generation apparatus can have a rotary blade in any form.

While embodiments of the present invention have been described as above, the embodiments can be variously modified. Further, the present invention is not limited in scope to the above-described embodiments. The scope of the present invention is defined by the terms of the claims, and is intended to include any modifications within the meaning and scope equivalent to the terms of the claims.

INDUSTRIAL APPLICABILITY

The present invention is suitably applied to a small-sized hydroelectric power generation apparatus installed in an irrigation canal or the like, in particular.

REFERENCE SIGNS LIST 1, 30: rotary blade; 2: gear box; 3: power generator; 4, 4a, 4b: beam; 4c: mount; 4d: support; 4e: base plate; 5a, 5b, 5c, 5d: bar; 6a: fixed portion; 6b: extending portion; 8: wall portion of water channel; 9: fixing device; 10: arrow; 11: hinge; 12: anchor bolt; 15: bolt; 20: bearing unit; 20a: inner race; 20b: outer race; 20c: rolling element; 20d: housing; 21: shaft; 30: vertical axis type rotary blade; 40: water surface.

The invention claimed is:

1. A hydroelectric power generation apparatus comprising:
a hydroelectric power generation module including a rotary blade and a power generator the power generator configured to generate power using rotation of the rotary blade;
a supporting part that supports the hydroelectric power generation module, the supporting part extending across a water channel so that a first end of the supporting part is disposed on a first side of the water channel and a second end of the supporting part is disposed on a second side of the water channel, the second end of the supporting part being opposite the first end of the supporting part, the second side being opposite the first side of the water channel; and
a bar having 1) a first end at one end of a longitudinal axis of the bar and 2) a second end at another end of the longitudinal axis of the bar, the first end of the bar being connected to the first end of the supporting part so that the longitudinal axis of the bar is perpendicular to a longitudinal axis of the supporting part,
wherein when the hydroelectric power generation apparatus is in a first state, 1) the rotary blade is below a surface of water flowing through the water channel and 2) the longitudinal axis of the bar is parallel to the surface of water flowing through the water channel,
wherein when the hydroelectric power generation apparatus is in a second state, 1) the rotary blade is above the surface of water flowing through the water channel and 2) the longitudinal axis of the bar is perpendicular to the surface of water flowing through the water channel, and
wherein the bar pivots about the first end of the bar to switch between the first state and the second state of the hydroelectric power generation apparatus, and
wherein the hydroelectric power generation apparatus further comprises a supporting member that rotatably supports the supporting part, the supporting member including 1) a first supporting member disposed on the first end of the supporting part and the first side of the water channel and 2) a second supporting member disposed on the second end of the supporting part and the second side of the water channel.

2. The hydroelectric power generation apparatus according to claim 1, further comprising a connecting member that detachably connects the bar to the supporting part.

3. The hydroelectric power generation apparatus according to claim 1, wherein the supporting member has a hinge.

4. The hydroelectric power generation apparatus according to claim 1, wherein the supporting member has a bearing.

5. The hydroelectric power generation apparatus according to claim 1, wherein the rotary blade is a horizontal-axis-type, propeller-type rotary blade.

6. The hydroelectric power generation apparatus according to claim 1, wherein the rotary blade is a vertical-axis-type rotary blade.

* * * * *